United States Patent

[11] 3,577,841

| [72] | Inventors | Claude Ledoux<br>Massy;<br>Bernard Neuville, Versailles, France |
|---|---|---|
| [21] | Appl. No. | 759,087 |
| [22] | Filed | Sept. 11, 1968 |
| [45] | Patented | May 11, 1971 |
| [73] | Assignee | Produits Chimiques Pechiney-Saint-Gobain<br>Neuilly-sur-Seine, France |
| [32] | Priority | Sept. 14, 1967 |
| [33] | | France |
| [31] | | PV 120,988 |

[54] EXTRUDERS WITH ROTATING PLATE
19 Claims, 6 Drawing Figs.

[52] U.S. Cl............................................. 18/12C,
18/30AF, 18/12SE
[51] Int. Cl....................................... B29f 3/012,
B29f 1/022
[50] Field of Search.......................................... 18/12 (A),
12 (C), 12 (M), 12 (SF), 12 (G), 12 (SI), 12 (SE),
12 (SB), 12 (SN), 12 (SA), 12 (SI), 30 (AF);
100/148, 145

[56] References Cited
UNITED STATES PATENTS

| 2,910,726 | 11/1959 | Parshall et al. | 18/12(SE)UX |
|---|---|---|---|
| 3,277,528 | 10/1966 | Nikiforov | 18/12(C) |
| 3,364,522 | 1/1968 | Ledoux | 18/12(C) |
| 3,411,180 | 11/1968 | Ledoux | 18/12(C) |
| 3,433,463 | 3/1969 | Pinney | 18/12(SE)X |

*Primary Examiner*—J. Spencer Overholser
*Assistant Examiner*—R. L. Spicer, Jr.
*Attorney*—Hersh McDougall ABSTRACT: A rotating plate extruder in which at least one of the faces of the plates is formed with grooves extending tangentially to a circle concentric with the axis of the plate to enhance use with lubricated plastic materials.

Patented May 11, 1971

INVENTORS
CLAUDE LEDOUX - BERNARD NEUVILLE
BY
McDougall, Hersh, Scott & Ladd
ATTYS.

EXTRUDERS WITH ROTATING PLATE

This invention relates to a rotating plate extruder and more particularly to an apparatus of the type described adapted for use in the extrusion of thermoplastic resinous materials modified to contain one or more additives and especially lubricants.

To avoid certain disadvantages inherent in conventional single screw extruders, apparatus which makes use of a "normal force effect" sometimes referred to as the "Weissenberg effect" has been developed. This effect, which is used for the extrusion of thermoplastic materials, is developed by the use of an apparatus having at least two parallel surfaces with a space therebetween into which the thermoplastic material is introduced. One of the surfaces is held stationary while the other is rotated relative thereto about an axis perpendicular to the surfaces, with an opening through the fixed surface through which the plastic material extrudes.

In U.S. Pat. No. 3,364,522, issued Jan. 23, 1968 and entitled "Plastic Extrusion Machine," description is made of a device of the type described which is adapted for the extrusion of thermally unstable polymers and particularly unplasticized polyvinyl chloride. As described in the aforementioned patent, the device is formed with a cavity that is eccentric to the rotating plate or rotor and which has a plurality of curvilinear deflector blades extending therein from one or the other or both of the surfaces to enhance homogenization of the thermoplastic material as well as its rapid displacement, while in the plastic state, towards the extrusion opening thereby to avoid thermal degradation of the resin. In the copending application Ser. No. 584,438, filed Oct. 5, 1966, now U.S. Pat. No. 3,411,180 and entitled "Plastic Extrusion Machine," description is made of an improvement in the apparatus of the type described in which chamfers are provided in the peripheral portions of the rotor and the stationary disc plate or stator, with the chamfered portions having an interfitting relationship or nesting relationship therebetween to enable relative rotational movement without friction but with minimum clearance. This improvement permits use of the apparatus for extrusion of unplasticized polyvinyl chloride through die openings of small cross section, as in the production of filaments and the like.

Difficulties have been experienced in the use of such apparatus for the extrusion of some polymers, especially polyvinyl chloride admixed with lubricants, without experiencing a perceptible amount of degradation and/or choking of the apparatus. The incorporation of lubricant into such resinous materials is often times desirable for the purpose of enhancing molding of the material to the desired shape. The lubricant also reduces undesirable adhesions of the resin to the surfaces of the dies or molds whereby it becomes possible to extrude at higher temperature and/or to obtain better homogenization and/or to improve the flow and ease of shaping of the material to the desired product.

Therefore, it is an object of this invention to provide an apparatus of the type described embodying certain improvements which enables the extrusion of thermally degradable polymers and particularly polymers containing added lubricant.

These and other objects and advantages of this invention will hereinafter appear and for purposes of illustration, but not of limitation, embodiments of the invention are shown in the accompanying drawings in which.

Figure 1:
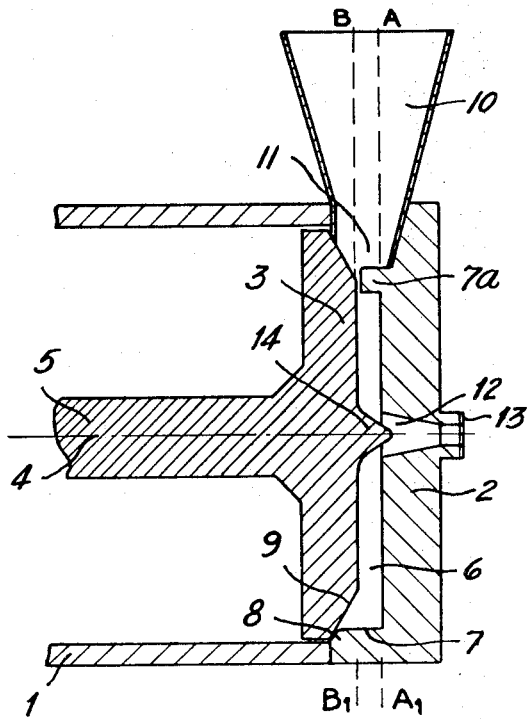
FIG. 1 is a sectional elevational view taken along the axis of an extrusion apparatus embodying the features of this invention.

The improvement of this invention resides in the formation of the surface of the stator and/or rotor with grooves formed in the surfaces slightly curved in a direction opposite that of the direction of displacement of the resinous material being extruded with respect to curves orthogonal to the trajectory of the material between the surfaces. The grooves are formed with sidewalls contoured in the direction to permit intake of material, that is to say with a slight slope on the side first encountered by the thermoplastic material during movement between the surfaces, on the one hand, and to thrust the material by the rotor or its adherence to the stator, that is to say, an abrupt inclination on the other side, on the other hand. The grooves are sufficient in number to permit entrainment by the rotor and momentary tack on the stator.

As a result, the location of the grooves should be arranged so that the resinous material enters the grooves along lines of greatest inclination of the grooves. Since the grooves should also favor centrifugal displacement of the material and since the material is given a spiral motion, the ideal form of the grooves would be slightly curved with a concavity turned in the direction opposite the displacement of the material. However, such curvilinear design is difficult to achieve on a commercial or practical basis. It has been found advantageous to trace the grooves along straight lines tangent to circles concentric with the axis of the rotor and radially spaced from the axis. The broken line formed by several grooves from the center to the outside of the plates is concave. This concavity is oriented in the direction opposite the displacement of the material. In the instance where the plates are chamfered, the grooves on such chamfered surfaces should follow the general direction of the grooves formed in the surfaces of the plates. It will be understood that the grooves may have different shapes, depending somewhat on the form of the plates on which they are traced.

In order to permit easy machining of the grooves, it is preferred to form the profile of the grooves to the shape of an asymmetric V but other closely related profiles can be employed. It is important that the grooves be formed with a gentle incline so as to permit easy entrance of the material from the side through which the material enters the grooves while providing a steep incline for the opposite side. The slope of the latter should make a full dihedral angle C with the surface within the range of 80°—135° and preferably 90°—120° while its inclination with the entrance side should correspond to an angle B greater than 60°.

The depth of the grooves may range from a maximum equal to the width of the gap between the surfaces of the rotor and stator and preferably less than two-thirds of the gap to a minimum which is not less than 0.1 mm. but which depends somewhat upon the properties of the plastic composition being processed through the apparatus, as will hereinafter be described.

The number of grooves should be sufficient to enable entrainment of the resin on the rotor on the one hand and momentary sticking onto the stator on the other hand. The minimum number of grooves and their dimension depend to a large extent on the diameter of the plates, and on the viscoelastic state of the resin being extruded, as influenced by the nature and amount of ingredients incorporated therein. In practice, it is desirable for each plate, namely the rotor and/or stator, to have at least four grooves and preferably at least 12 grooves in their surfaces.

The grooves are preferably formed to cover the entire surface of the plate conforming to the gap or cavity. In the event that such plate or plates embody blades of the type previously described, the disc portions from which the blades extend need not contain grooves. Where the plate surfaces are formed with conical sections in the area corresponding to the extrusion opening, the grooves in such conical portions are preferably formed to a greater depth than in the remainder.

Referring now to the drawings for a description of the practical application of this invention, FIG. 1 illustrates an extrusion apparatus having a frame 1 mounting a vertically disposed stator 2 in fixed position on the end thereof. Mounted for rotational movement relative the stator is a rotor 3 in the form of a flat disc plate mounted on the end of a rotatable shaft 5 with the face of the rotor in parallel relation with the inner surface of the stator 2. The shaft 5 is adapted to be rotated about its axis 4 by means of a suitable driving means such as a motor (not shown) coupled to the shaft through a driving belt or through a variable speed gear drive (not shown).

The stator is cut out on its inner side facing the rotor or otherwise formed with a cylindrical cavity 6 defined between sidewalls 7 arranged slightly eccentric to the axis of the rotor and of lesser radius than the latter. The salient edges of the stator and rotor are beveled to provide intermeshing chamfered surfaces 8 and 9 which nest one in the other without friction therebetween but with minimum clearance to define a substantially sealed cavity.

A feed hopper 10 is located in the upper portion of the apparatus adjacent the periphery of the stator, where the greatest eccentricity exists in the cavity between the rotor and stator, with the base of the feed hopper merging into the feed opening 11, limited in part by the chamfered extension 79 of the gap edge. Coaxial with the rotor, the stator is formed with an extrusion opening 12 of frustoconical shape extending therethrough for feeding the plastic material into the die opening of a die 13 mounted on the stator. In the corresponding area, the rotor is formed with a tip 14, preferably of frustoconical shape, which extends into the frustoconical opening of the rotor with the tip being provided on its surface with blades or grooves to assist in the displacement of the material through the extrusion opening.

Figure 2:
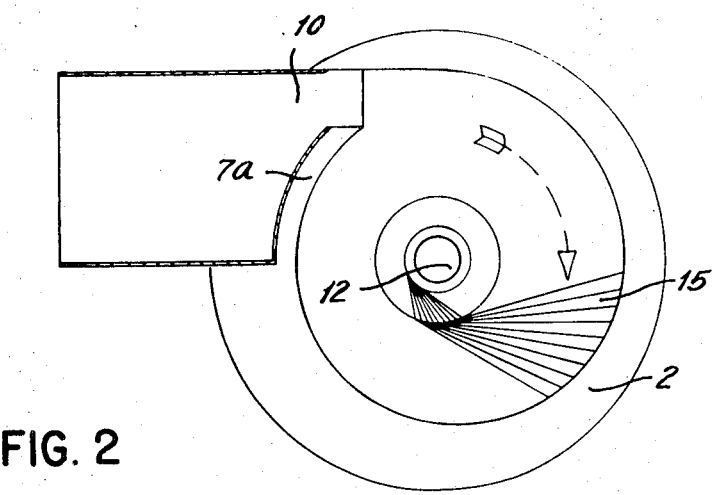
FIG. 2 is a plan view of the apparatus shown in FIG. 1 taken along the line A-A of FIG. 1.

FIG. 2 illustrates a stator having grooves 12 formed in its internal surface with the grooves extending outwardly tangentially from a circle concentric with the rotor axis and radially spaced therefrom. In FIG. 2, the arrow indicates the direction in which the material is displaced during operation of the extruder.

Figure 3:
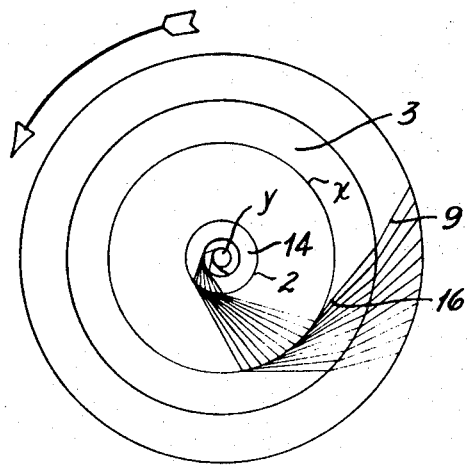
FIG. 3 is a plan view taken along the line B-B of FIG. 1.

FIG. 3 illustrates a rotor 3 with the chamfered peripheral edge portion 9. Grooves 16 are formed in the surfaces to extend outwardly tangentially from a number of radially spaced concentric inner circles X, Y and Z. In the modification shown in FIG. 3, the grooves in the conical tip 14 are of greater depth than the others formed in face of the rotor. The arrow indicates the direction of rotation of the rotor during operation of the extruder.

Figure 4:
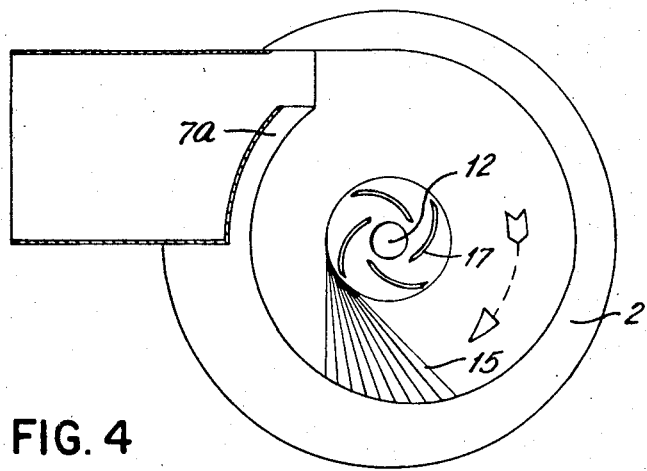
FIG. 4 is a view similar to that of FIG. 2 showing a modification in the stator.

FIG. 4 illustrates a stator having a curvilinear blade 17 extending from the face of the stator into the cavity in the portion immediately adjacent the extrusion opening 12. It will be seen that the grooves 15 do not extend into the area from which the blades project but instead extend outwardly from the periphery of the circle defined by the extremeties of the blades.

Figure 5:
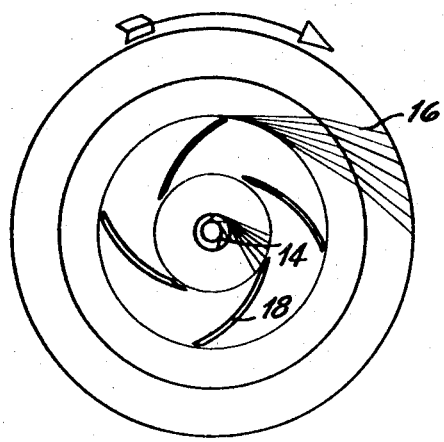
FIG. 5 is a view similar to that of FIG. 3 showing a modification in the rotor.

FIG. 5 illustrates a rotor having a plurality of curvilinear blades 18 extending forwardly from the inner surface thereof into the cavity. The grooves 16 are confined to the zones external and internal of the blades. The grooves in the frustoconical tip 14 are deeper and less numerous than in the face of the rotor.

Figure 6:
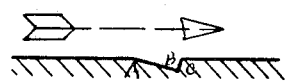
FIG. 6 is a sectional view through a surface portion of a plate illustrating the profile of a groove.

FIG. 6 illustrates the profile or cross-sectional contour of the groove with the arrow indicating the direction of movement of the material between the surfaces during operation of the extruder. It will be seen that the slope on the incoming side of the groove is much shallower than the slope on the outgoing side of the groove.

Without departing from the scope of the invention, it will be understood that the concepts of this invention can be combined into a number of embodiments. For example, use can be made of plates having only grooves in the adjacent surfaces of the rotor and stator without the use of curvilinear blades, or use can be made of apparatus having curvilinear blades in one or the other or both of the surfaces in addition to the grooves. The curvilinear blades operate to accelerate through-put of the material and to increase output of the extruder. In the preferred practice of this invention, both blades and grooves are embodied in only one of the plates, preferably the stator, while the other is formed only with grooves of the type employed in the practice of this invention.

The extruder of this invention finds beneficial use especially in the extrusion of thermodegradable resins containing one or more lubricants. The depth of the grooves is influenced somewhat by the amount of lubricant and its effect on the tack of the resinous material. The grooves are also beneficial for extrusion of resinous materials containing other ingredients which tend to reduce the tack of the resinous material while in the plastic state, such as by the use of plasticizers and/or stabilizers.

The following examples are given by way of illustration, but not by way of limitation, of the invention:

EXAMPLE 1

The extruder described above comprises a vertically disposed rotor having a working diameter of 180 mm. and a chamfer of 15 mm. in width with the chamfer having an angle of 30° with the surface of the plate and which fits with minimum clearance into the corresponding chamfer on the periphery of the stator with a gap between the plates of 5 mm. The stator has four curved blades of 30 mm. length located adjacent the die opening. Grooves are provided on the surface of the stator to extend tangentially to the circle formed by the outer ends of the blades and also on the chamfer which has the same slope as on the rotor. The single extrusion opening has a diameter of 6 mm. Grooves are formed on the rotor to extend tangentially from circles having their center on the axis of the rotor and spaced from the axis along radii of 3 and 10 cm. in a ratio of one groove for each 2°. Grooves are also provided on the base of the frustoconical tip on the rotor with the latter grooves being less numerous for reason of space and having a depth in the range of 5 mm. The grooves on the surface of the plates and those on the chamfer have a depth of about 0.2 mm. with the grooves on the chamfer conforming to a prolongation of those on the plate surface. The profile of the grooves is as illustrated in FIG. 6, with the full dihedral angles of the grooves with the plate surface being 165° for the ingoing side angle A and 105° for the other side angle C.

After heating the apparatus, as by means of resistance heaters located in the body of the plates, to bring the gap to a temperature of 200° C, the rotor is turned at a rate of 120 r.p.m. Through the feed hopper there is introduced a composition comprising 100 parts by weight of polyvinyl chloride, prepared by block polymerization, having a viscosity AFNOR of 80 (K valve:57) containing 2.5 parts by weight of a commercial stabilizer, such as tin glycolate. Heating is discontinued and the heat required for reducing the material to a plastic state is thereafter generated by the shearing of the resin. After operation for a few minutes to reach stabilized working conditions, a clear transparent rod of regular shape is extruded from the die at a temperature of 240° C. The output is 28.5 kg./h.

EXAMPLE 2

This example is given to show the influence of the profile of the grooves and their orientation with regard to the direction of displacement of the material being extruded.

The same material as in example 1 is extruded with a similar apparatus under similar conditions except that the profiles of the grooves are inversed so that the resin enters into the groove through the abrupt slope.

The output of the extruder for each of the speeds indicated in example 1 is 30 percent below the outputs achieved in example 1. The rod extruded from the die has a distinct yellowish color, indicating the beginning of resin decomposition.

EXAMPLE 3

The trial described in this example is carried out in the apparatus of example 1, with the same initial composition modified by the addition of one part per 100 parts by weight of polyvinyl chloride of a mineral wax marketed under the trade name "Ceresine 162 P," for the lubrication of polyvinyl chloride.

After 10 minutes operation under the same conditions as in example 1, the output is 50 percent below that obtained with the resin of example 1 and the product rapidly becomes decomposed to such an extend that the trial must be terminated.

EXAMPLE 4

The composition of example 3 is introduced in the apparatus of example 1 but with the grooves deepened to 0.5 mm. while keeping the same profile.

The output for a rotor speed of 80 r.p.m., under the same conditions as in example 1 is 20 kg./h. which is slightly below that of the unlubricated product extruded under the same conditions. The extruded material shows no decomposition.

EXAMPLE 5

In this trial, the apparatus of example 4 is used with a composition of 100 parts by weight polyvinyl chloride of example 1 with a part of the same stabilizer and modified by the addition of 0.9 parts by weight mineral wax of example 3 and 0.3 parts by weight stearic acid.

After a few minutes of operation under the same conditions as in example 1 the output decreases and the material colors, indicating decomposition.

EXAMPLE 6

The mixture described in example 5 is introduced into the same apparatus but in which the grooves have been increased to a depth of 2 mm. When the rotor is driven at a rate of 60 r.p.m., the output under the previously described conditions is 14 kg./h. The same machine at the same rotor speed gives an output of 15.5 kg./h. with the composition of example 1. In both cases, the temperature of the material at the outlet is 225° C. The rod issued from the die is clear, transparent and of uniform cross section.

EXAMPLE 7

This trial is carried out with the composition of example 3 in an apparatus similar to that of example 6 but with the plates provided only with grooves. The rotor is turned at 60 r.p.m. The extrusion of the composition is carried out under good conditions at the ratio of 9 kg./h. with the temperature of the material at the outlet at 235° C.

A similar apparatus having blades on both plates gives similar results but with outputs higher than that of an extruder having blades on but one of the plates.

It will be apparent from the foregoing that we have provided an improvement in the construction of the rotor and stator plates used in the more recently developed rotary plate extruders which operate on the principle of the "Weissenberg effect." It will be apparent further that the improvement of this invention, while being capable of use with resinous materials of the type previously extruded through apparatus of the type described, enables further efficient use to be made of the apparatus for the extrusion of thermally degradable materials which otherwise could not efficiently be processed through machines of the type described by reason of the presence of materials which reduce tack while in the plastic stage.

It will be understood that changes may be made in the details of construction, arrangement and operation without departing from the spirit of the invention, especially as defined in the following claims.

We claim:

1. In an extruder formed of a pair of plates arranged to provide substantially parallel facing surfaces perpendicular to the axis of rotation providing a gap of disc shape therebetween with a feed-opening communicating with the outer periphery of the plates and an extrusion opening axially through a central portion of one of the plates, means for rotating one of the plates relative to the other and means for feeding material to be extruded into the gap between the facing surfaces of the plates for shear of the material as it is displaced through the gap from the periphery to the extrusion opening in response to rotational movement of one of the plates, the improvement comprising grooves in at least one of the facing surfaces of the plates in the shear area between the periphery and the extrusion opening.

2. An extruder as claimed in claim 1 in which the grooves on the inner faces of the plates present a concavity turned in the opposite direction to the displacement of the material.

3. In an extruder formed of a pair of plates arranged to provide spaced substantially parallel facing surfaces perpendicular to the axis of rotation providing a gap therebetween, an extrusion opening axially through one of the plates, means for rotating one of the plates relative to the other and means for feeding material to be extruded into the gap between the facing surfaces of the plates, the improvement comprising grooves in at least one of the facing surfaces of the plates in which the grooves are substantially V-shaped in cross section with the ingoing side first engaged by the material having a slope which is more gentle than the slope of the outgoing side.

4. An extruder as claimed in claim 3 in which the angle between the ingoing side and the plane of the surface is within the range of 80°—135°.

5. An extruder as claimed in claim 3 in which the angle between the ingoing side and the plane of the surface is within the range of 90°—120°.

6. An extruder as claimed in claim 3 in which the angle between the outgoing side and the ingoing side of the grooves is greater than 60°.

7. An extruder as claimed in claim 1 in which the grooves are formed to a depth less than the spaced relationship between the surfaces.

8. An extruder as claimed in claim 1 in which the grooves are formed to a depth less than two-thirds of the spaced relationship between the surfaces.

9. An extruder as claimed in claim 1 in which the grooves extend tangentially outwardly from circles concentric with the axis of the plate.

10. An extruder as claimed in claim 1 in which there are at least four grooves in the surface of the plate.

11. An extruder as claimed in claim 1 in which the plate is formed with at least 12 grooves in the surface thereof.

12. In an extruder formed of a pair of plates arranged to provide spaced substantially parallel facing surfaces perpendicular to the axis of rotation providing a gap therebetween, an extrusion opening axially through one of the plates, means for rotating one of the plates relative to the other and means for feeding material to be extruded into the gap between the facing surfaces of the plates, the improvement comprising grooves in at least one of the facing surfaces of the plates in which the grooves extend across the entire surface of the plate with the operative area of the plate.

13. An extruder as claimed in claim 1 which includes curvilinear deflection blades extending from the surface of at least one of the plates into the gap.

14. An extruder as claimed in claim 13 in which the blades are located in the central zone of the plate.

15. An extruder as claimed in claim 13 in which the portion of the plate occupied by the blades is free of the grooves.

16. In an extruder formed of a pair of plates arranged to provide spaced substantially parallel facing surfaces perpendicular to the axis of rotation providing a gap therebetween, an extrusion opening axially through one of the plates, means for rotating one of the plates relative to the other and means for feeding material to be extruded into the gap between the facing surfaces of the plates, the improvement comprising grooves in at least one of the facing surfaces of the plates in which the grooved plate is formed with grooves that extend tangentially for more than one radially spaced circle concentric with the axis of the plate.

17. An extruder as claimed in claim 1 which includes a projection on the plate opposite the plate having the extrusion opening which includes an extension in axial alignment with the extrusion opening and which includes grooves in the surface of the projection.

18. An extruder as claimed in claim 17 in which the grooves in the projection have a depth greater than the grooves in the surface of the plate.

19. In an extruder formed of a pair of plates arranged to provide spaced substantially parallel facing surfaces perpendicular to the axis of rotation providing a gap therebetween, an extrusion opening axially through one of the plates, means for rotating one of the plates relative to the other and means for feeding material to be extruded into the gap between the facing surfaces of the plates, the improvement comprising grooves in at least one of the facing surfaces of the plates with grooves extending tangentially outwardly from one or more circles concentrically spaced from the axis of the plate.

UNITED STATES PATENT OFFICE

CERTIFICATE OF CORRECTION

Patent No. 3,577,841            Dated May 11, 1971

Claude Ledoux et al.

It is certified that error appears in the above identified patent and that said Letters Patent are hereby corrected as shown below:

In the priority claim, the patent shows the number of the French application as PV 120,988 whereas the correct number is PV 120,998.

Signed and sealed this 19th day of October 1971.

(SEAL)
Attest:

EDWARD M. FLETCHER, JR.      ROBERT GOTTSCHALK
Attesting Officer               Acting Commissioner of Patents